United States Patent
Nilsbo et al.

(10) Patent No.: US 7,957,481 B2
(45) Date of Patent: Jun. 7, 2011

(54) METHOD AND AN APPARATUS FOR ESTIMATING A DELAY SPREAD OF A MULTIPATH CHANNEL

(75) Inventors: Magnus Nilsbo, Älta (SE); Tharaka Lamahewa, Coburg North (AU); Scott Leyonhjelm, Moonee Ponds (AU)

(73) Assignee: Nanoradio AB, Kista (SE)

( * ) Notice: Subject to any disclaimer, the term of this patent is extended or adjusted under 35 U.S.C. 154(b) by 44 days.

(21) Appl. No.: 12/450,836

(22) PCT Filed: Apr. 26, 2007

(86) PCT No.: PCT/SE2007/050275
§ 371 (c)(1),
(2), (4) Date: Oct. 15, 2009

(87) PCT Pub. No.: WO2008/133559
PCT Pub. Date: Nov. 6, 2008

(65) Prior Publication Data
US 2010/0085865 A1    Apr. 8, 2010

(51) Int. Cl.
H04L 27/28 (2006.01)
H04L 27/06 (2006.01)
(52) U.S. Cl. .................................. 375/260; 375/340
(58) Field of Classification Search ............... 375/260, 375/340, 346
See application file for complete search history.

(56) References Cited

U.S. PATENT DOCUMENTS

| | | | |
|---|---|---|---|
| 6,028,901 A | 2/2000 | Huynh et al. | |
| 6,370,397 B1 | 4/2002 | Popovic et al. | |
| 6,731,622 B1 | 5/2004 | Frank et al. | |
| 7,027,527 B2 | 4/2006 | Krauss et al. | |
| 7,133,474 B2 | 11/2006 | Ramasubramanian et al. | |
| 2003/0026360 A1 | 2/2003 | Ramasubramanian et al. | |
| 2006/0227904 A1 | 10/2006 | Mueller-Weinfurtner et al. | |
| 2006/0239178 A1 | 10/2006 | Svensson et al. | |
| 2006/0239179 A1 | 10/2006 | Berkeman et al. | |
| 2007/0160159 A1* | 7/2007 | Song et al. | 375/260 |
| 2007/0206689 A1* | 9/2007 | Koo et al. | 375/260 |
| 2008/0031370 A1* | 2/2008 | Guey et al. | 375/260 |
| 2008/0152033 A1* | 6/2008 | Gore et al. | 375/260 |
| 2009/0274252 A1* | 11/2009 | Ghosh | 375/346 |

FOREIGN PATENT DOCUMENTS

| | | |
|---|---|---|
| EP | 1 294 148 | 3/2003 |
| WO | WO 99/57819 | 11/1999 |
| WO | WO 2004/064345 | 7/2004 |
| WO | WO 2006/111276 | 10/2006 |

* cited by examiner

Primary Examiner — Don N Vo
(74) Attorney, Agent, or Firm — Harness, Dickey & Pierce, P.L.C.

(57) ABSTRACT

Low complex algorithms for estimating a delay spread or a RMS delay spread of a multipath channel using channel estimates are disclosed, leading to low overall power consumption. According to an embodiment of the present invention, a delay spread or a RMS delay spread of the multipath channel is determined based on a metric calculated as a function of channel estimates. In another embodiment, an average signal to noise ratio is taken into consideration in addition to the metric to estimate the delay spread or the RMS delay spread. In a further embodiment, the delay spread or the RMS delay spread of the multipath channel is estimated based on an average signal to noise ratio and on a metric being a function of the slope between subcarrier channel estimates. The present invention further relates to an apparatus for estimating a delay spread or a RMS delay spread of the multipath channel.

29 Claims, 11 Drawing Sheets

| METRIC VALUES | RMS DELAY SPREAD VALUES |
| --- | --- |
| 0.5915 | 5 |
| 0.822 | 10 |
| 0.9733 | 15 |
| 1.1957 | 25 |
| 1.4879 | 50 |
| 1.6479 | 75 |
| 1.7568 | 100 |
| 1.8383 | 125 |
| 1.8906 | 150 |
| 1.9428 | 175 |
| 1.9797 | 200 |
| 2.0104 | 225 |
| 2.0415 | 250 |

FIGURE 4B

| RMS DELAY SPREAD/SNR | 5dB | 10dB | 15dB | 20dB | 25dB | 30dB |
|---|---|---|---|---|---|---|
| 5 | 1.5972 | 1.1058 | 0.7717 | 0.5968 | 0.5101 | 0.4876 |
| 10 | 1.6886 | 1.2818 | 0.9941 | 0.8311 | 0.7549 | 0.7077 |
| 15 | 1.7627 | 1.3965 | 1.1309 | 0.9779 | 0.9115 | 0.8729 |
| 25 | 1.8322 | 1.5426 | 1.3292 | 1.2110 | 1.1349 | 1.1078 |
| 50 | 1.9473 | 1.7392 | 1.5839 | 1.4838 | 1.4626 | 1.4212 |
| 75 | 2.0105 | 1.8418 | 1.7212 | 1.6469 | 1.6155 | 1.6079 |
| 100 | 2.0595 | 1.9105 | 1.8095 | 1.7652 | 1.7340 | 1.7187 |
| 125 | 2.0853 | 1.9551 | 1.8816 | 1.8374 | 1.8162 | 1.8181 |
| 150 | 2.1026 | 1.9997 | 1.9252 | 1.8903 | 1.8791 | 1.8676 |
| 175 | 2.1287 | 2.0415 | 1.9632 | 1.9415 | 1.9358 | 1.9305 |
| 200 | 2.1363 | 2.0564 | 2.0016 | 1.9777 | 1.9725 | 1.9671 |
| 225 | 2.1527 | 2.0764 | 2.0280 | 2.0093 | 2.0036 | 2.0009 |
| 250 | 2.1683 | 2.0977 | 2.0551 | 2.0412 | 2.0409 | 2.0289 |

FIGURE 6B

METHOD AND AN APPARATUS FOR ESTIMATING A DELAY SPREAD OF A MULTIPATH CHANNEL

TECHNICAL FIELD OF THE INVENTION

The present invention relates generally to the field of digital communication systems, and more particularly to a method and an apparatus for estimating a delay spread of a multipath channel.

BACKGROUND OF THE INVENTION

In digital communication systems such as wired, wireless and optical communication systems, a transmitted signal reaches a receiver after propagation though a channel. In the propagation channel, the transmitted signal interacts with the environment in a very complex way. As an example, signal propagation though a wireless communication channel causes various types of impairment in a received signal due to reflections from large obstacles, diffraction around smaller objects and edges, and refraction through the medium and signal scattering. In a wired channel, such as an ADSL channel, impairments in a received signal may be caused by reflections due to cable mismatching and imperfect terminations. In an optical fibre system, impairments in a received signal are caused due to multiple reflections at connectors and splices. These complex interactions result in reception of multiple delayed versions or replicas of the transmitted signal through multiple paths with each version or replica having randomly distributed amplitude and phase. In general, a channel is known to experience a delay spread (time dispersion) due to multiple paths and is referred to as a multipath fading channel.

Multipath fading may cause errors in signal decoding due to inter-symbol-interference (ISI) and may further affect the performance of communication systems. Therefore, the delay spread is considered to be one of the most important characteristics of propagation channels since it affects the performance of the communication systems. The knowledge about the delay spread of a channel can thus be used for designing a better receiver structure which can adapt itself to deal with the changing nature of the underlying channel and provide an improved performance that enhances the user experience. A large number of delay spread estimation techniques are found in the prior art.

In the U.S. Pat. No. 7,027,527, a method for detecting the presence of an excess delay spread within a received signal is described. In this prior art, a quantitative estimation of a similarity of two segments of the received signal is calculated. The two segments are chosen from synchronization data, where the first segment corresponds to data on even-numbered OFDM (orthogonal frequency domain multiplexing) subcarriers and the second segment corresponds to data on odd-numbered OFDM subcarriers. In determining the presence of the excess delay spread, the quantitative estimation is compared to a detection threshold. A drawback with the delay spread estimation technique disclosed in this prior art is that the method only detects the excess delay spread in the received signal and does not quantify the amount of delay spread in the channel.

In the U.S. Pat. No. 6,028,901, a method of selecting and deselecting an equalizer is performed based on an estimated delay spread in the channel. In this prior art, the path ratio, which is the ratio between the dominant path's power amplitude to the secondary path's power amplitude indicates the amount of delay spread in the received signal. A matched filtering operating is further used to estimate the channel and extract the impulse response of the channel. In addition, a threshold delay spread is determined and the estimated delay spread is compared to the threshold in order to decide whether to select the equalizer or not. A drawback with the method described in this prior art is that the delay spread estimation process is computationally intensive leading to high power consumption of the receiver.

SUMMARY OF THE INVENTION

The present invention addresses the needs above as well as other needs by providing a method and an apparatus for estimating a delay spread of a multipath channel.

According to a first aspect of the present invention, the above stated problem is solved by means of a method for estimating a delay spread of a multipath channel that is formed by successive packets of a multicarrier signal, wherein each packet is comprised of a plurality of subcarriers carrying data. According to the method of the present invention, a magnitude value of a channel estimate of each subcarrier, in each received packet, is estimated excluding null subcarriers. Thereafter, a mean magnitude value of the estimated magnitude values of the channel estimates is calculated for each received packet and after that a predetermined number of packets have been received; a delay spread of the multipath channel is estimated based on a metric. The metric is according to the present invention calculated as a function of the estimated magnitude values of the channel estimates and the mean magnitude values that are determined for each received packet.

According to a second aspect of the present invention, the above stated problem is solved by means of an apparatus for estimating a delay spread of a multipath channel formed by successive packets of a multicarrier signal each comprising a plurality of subcarriers carrying data. The apparatus of the present invention comprises a receiver that is configured to estimate, for each received packet, a magnitude value of a channel estimate of each subcarrier excluding null subcarriers; a delay spread estimator that is configured to calculate, for each received packet, a mean magnitude value of the estimated magnitude values of the channel estimates, the delay spread estimator is further adapted to estimate, after a predetermined number of packets have been received, a delay spread or a root mean square delay spread of the multipath channel based on at least a metric which is calculated as a function of the estimated magnitude values of the channel estimates and the mean magnitude values.

In the present invention, because the delay spread estimation is based on a metric calculated as a function of the estimated magnitude values of the channel estimates and the mean magnitude values that are determined for each received packet, sufficient accuracy is achieved using low complex delay spread estimation techniques that lead to a low overall power consumption of the apparatus.

The present invention will now be described in more detail by means of preferred embodiments and with reference to the accompanying drawings, attention to be called to the fact, however, that the following drawings are illustrative only, and that changes may be made in the specific embodiments illustrated and described within the scope of the appended claims.

BRIEF DESCRIPTION OF THE DRAWINGS

FIG. 4B illustrates a lookup table corresponding to the curve shown in FIG. 4A.

FIG. 6B depicts a lookup table corresponding to the curves shown in FIG. 6A.

DETAILED DESCRIPTION OF THE INVENTION

The invention is described in a general context in relation to multicarrier communication systems such as OFDM (Orthogonal Frequency Division Multiplexing) based systems for communicating data. By way of example, the present invention may be applied to WLAN (Wireless Local Area Network) systems, IEEE 802.11 (Institute of Electrical and Electronics Engineers) systems WiFi (Wireless Fidelity), WiMAX (Worldwide Interoperability for Microwave Access) systems, ADSL (Asymmetric Digital Subscriber Line) systems or any other system that is based on OFDM.

As is well known in the art, an estimation of a channel is necessary before the demodulation of OFDM signals since the channel is time-varying and often frequency selective. The OFDM channel estimation can e.g. be calculated using predefined training symbols, also known as preamble, or pilot subcarriers that are inserted into the data symbols.

Figure 1:
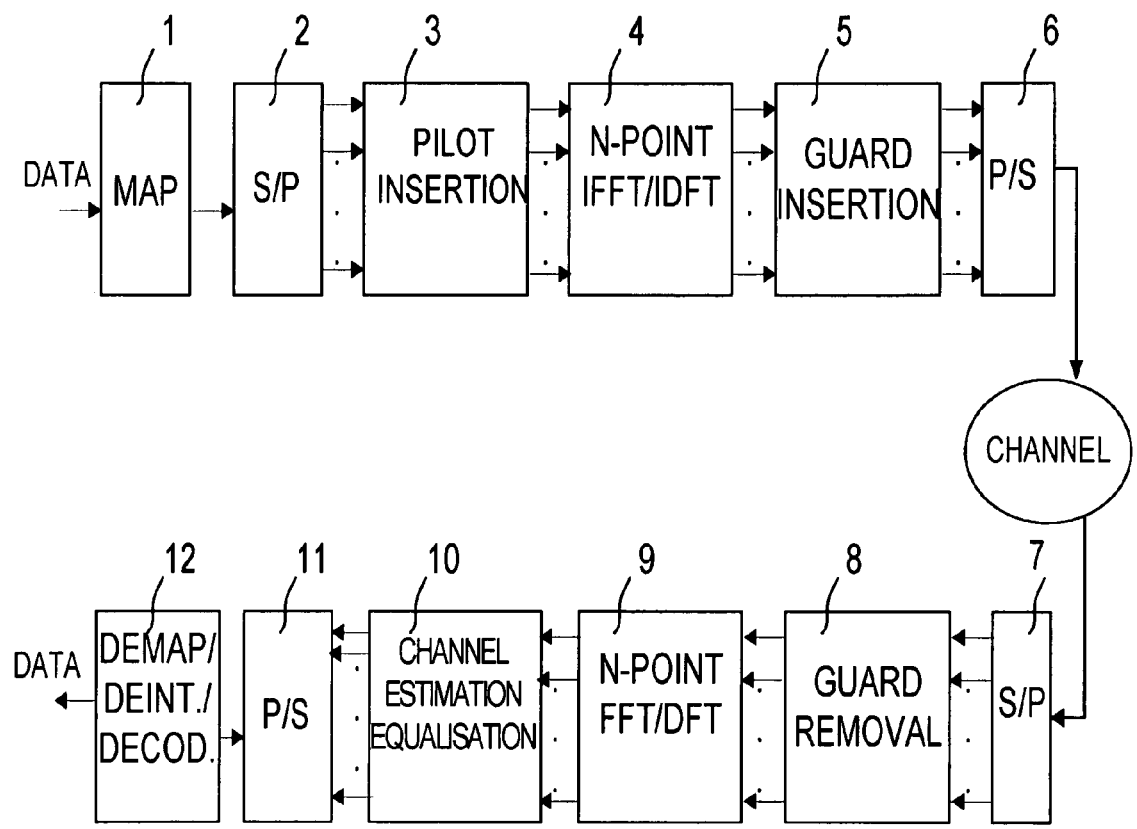
FIG. 1 is a block diagram illustrating an example of a general baseband OFDM system.

FIG. 1 illustrates an example of an OFDM system based on pilot channel estimation. As illustrated, the binary data in serial is first grouped and mapped according to a predefined modulation in the signal mapper 1. Examples of predefined modulation used in the mapper are BPSK QPSK, QAM, 16QAM, 64QAM etc. . . . The serial data is further converted into parallel data in a serial to parallel converter (S/P) 2 and pilots are inserted in a pilot insertion module 3 into some subcarriers. An N-point inverse fast Fourier transform (IFFT) or inverse discrete fast Fourier transform (IDFT) module 4 is subsequently used to convert the data sequence of length N into time-domain signal. Following the IFFT/IDFT module 4, a guard time, which is chosen to be larger than the expected delay spread of the channel, is inserted in a guard insertion module 5, to prevent ISI. This guard interval includes the cyclically extended part of OFDM symbol in order to eliminate inter-symbol-interference (ISI). The signal including the guard interval is further passed through a multipath channel 7 with additive noise often represented as an additive white Gaussian noise (AWGN). At the receiver and after passing to discrete domain though an analogue to digital converter (A/D) and low pass filter, the guard interval is removed in a guard removal module 8 and the received signal is sent to a N-point (FFT/DFT) module 8 that converts the time discrete received signal into a frequency domain multicarrier signal. Following the FFT/DFT module 9, predefined preamble or the pilot subcarriers that are inserted into the data symbols are extracted and channel estimates for the data sub-channels are estimated in a channel estimation module 10. Then the transmitted data is estimated by equalising (correcting) the frequency domain multicarrier data symbols with the channel estimates. Subsequently, the binary information data is obtained back in a signal demapper/deinterleaver and Viterbi decoding module 12. Note that the OFDM system of FIG. 1 is only described in order to understand the principles of an OFDM system based on pilot channel estimation. The present invention is therefore not restricted a channel estimation method and/or system based on predefined preamble signal or pilot subcarriers inserted into the data symbols, i.e. any appropriate prior art channel estimation method may be used (e.g. blind or adaptive channel estimation methods).

As mentioned earlier, the knowledge about the delay spread of a channel can be used for designing a better receiver structure which can adapt itself to deal with the changing nature of the underlying channel and provide an improved performance that enhances the user experience.

Hereinafter, a method for estimating a delay spread or the root mean square (RMS) delay spread of a multipath channel will be described according to embodiments of the present invention.

Figure 2:
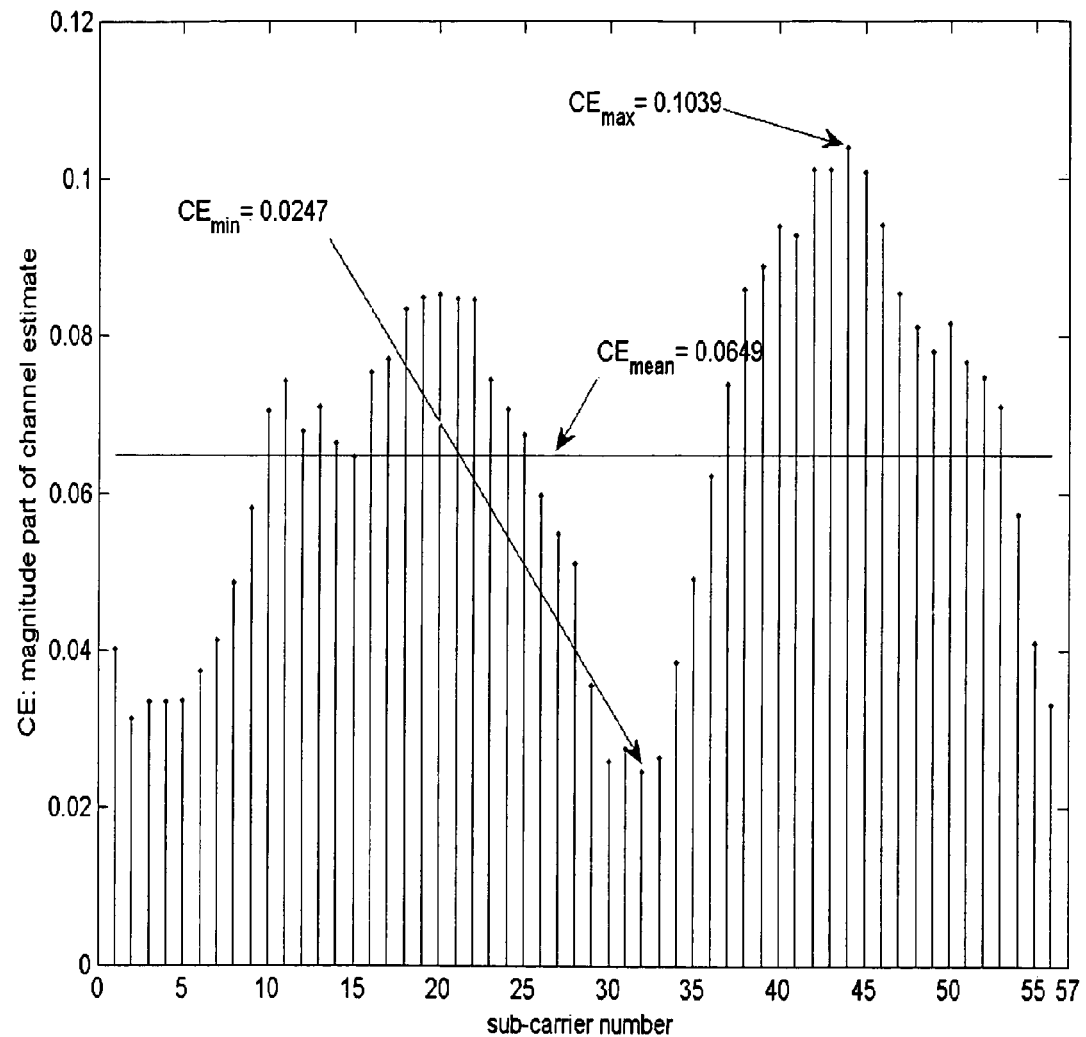
FIG. 2 illustrates an example of magnitude values of channel estimates of 56 subcarriers of an OFDM packet excluding null subcarriers.

The estimation of a delay spread (or RMS delay spread) of a multipath channel is based on magnitude values, denoted $CE_k$, of channel estimates, wherein k represents a subcarrier number, excluding null subcarriers, of an OFDM signal. As an example, FIG. 2 illustrates magnitudes $CE_k$ of channel estimates, excluding null subcarriers, of a data packet of a multicarrier signal, composed of 56 high-throughput data subcarriers of an IEEE 802.11n OFDM wireless system.

Figure 3:
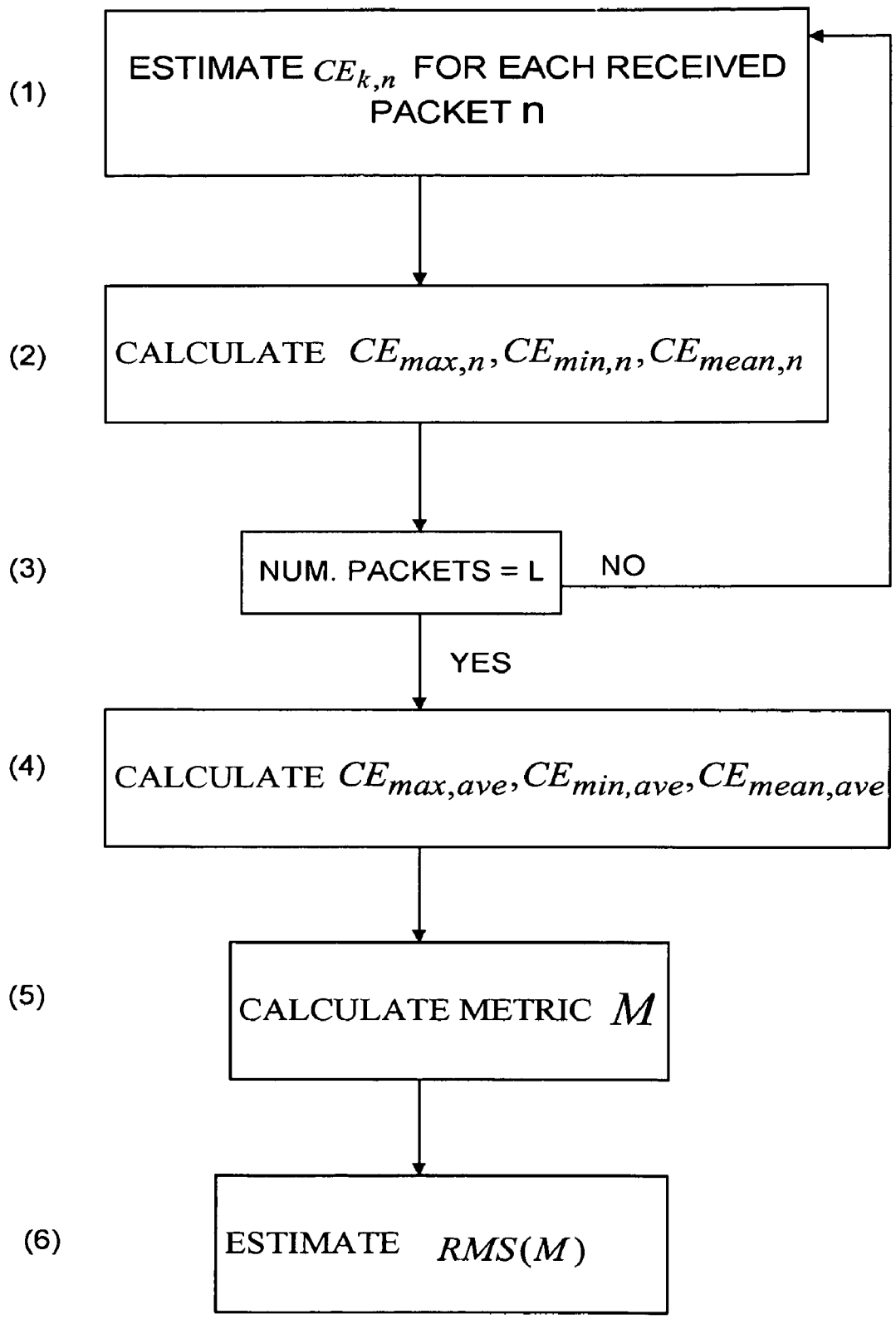
FIG. 3 is a flowchart of a method for estimating a delay spread (or RMS delay spread) of a multipath channel according to a first exemplary embodiment of the present invention.

Referring to FIG. 3, there is illustrated a flowchart of a method for estimating a delay spread (or RMS delay spread) of a multipath channel according to a first exemplary embodiment of the present invention. In step 1, a magnitude value $CE_{k,n}$ of a channel estimate of each subcarrier k excluding null subcarriers, are estimated for each received packet n of a multicarrier signal. In step 2, the maximum value $CE_{max,n}$, the minimum value, $CE_{min,n}$ and the mean value $CE_{mean,n}$ of the estimated magnitude values $CE_k$ of the channel estimates, are, for each received packet n calculated and stored. $CE_{max,n}$, $CE_{min,n}$ and $CE_{mean,n}$ are given by the following expressions:

$$CE_{max,n} = \text{Max}(CE_{1,n}, CE_{2,n}, CE_{3,n}, \ldots, CE_{k,n}) \quad (1)$$

$$CE_{min,n} = \text{Min}(CE_{1,n}, CE_{2,n}, CE_{3,n}, \ldots, CE_{k,n}) \quad (2)$$

$$CE_{mean,n} = \frac{1}{N}\sum_{k=1}^{N} CE_{k,n} \quad (3)$$

where n is the number of the received packet, k is the number of the subcarrier, and N is the number of all subcarriers excluding null-subcarriers. Example values of $CE_{max,n}$, $CE_{min,n}$ and $CE_{mean,n}$ are illustrated in FIG. 2.

In step 3 of FIG. 3, a check is performed on whether or not a predetermined number of packets L have been received. The predetermined number of packets L is a design parameter and may for example be equal to 3, 4, 5, 10 or any other number. It should be mentioned that the higher the value of L, the higher the channel estimation accuracy.

Referring back to step 3 of FIG. 3, in case all packets L have been received, an average of $CE_{max,n}$, $CE_{min,n}$ and $CE_{mean,n}$, denoted by $CE_{max,ave}$, $CE_{min,ave}$ and $CE_{mean,ave}$ respectively, are calculated according to the following equations:

$$CE_{max,ave} = \frac{1}{L}\sum_{n=1}^{L} CE_{max,n} \quad (4)$$

$$CE_{min,ave} = \frac{1}{L}\sum_{n=1}^{L} CE_{min,n} \quad (5)$$

$$CE_{mean,ave} = \frac{1}{L}\sum_{n=1}^{L} CE_{mean,n} \quad (6)$$

Note that if not all L packets have been received, steps 1 to 3 are repeated until all L packets have been received.

In step 4, a metric M is according to this first exemplary embodiment of the present invention, calculated as a function of the estimated magnitude values $CE_{k,n}$ of the channel estimates and of the mean magnitude values $CE_{mean,n}$. The metric M is given by:

$$M = \frac{\frac{1}{L}\sum_{n=1}^{L}\text{Max}(CE_{1,n}, CE_{2,n}, CE_{3,n}, \ldots, CE_{k,n}) - \frac{1}{L}\sum_{n=1}^{L}\text{Min}(CE_{1,n}, CE_{2,n}, CE_{3,n}, \ldots, CE_{k,n})}{\frac{1}{L}\sum_{n=1}^{L} CE_{mean,n}}$$

The metric M may further be simplified by eliminating the factor 1/L in the above expression:

$$M = \frac{\sum_{n=1}^{L}\text{Max}(CE_{1,n}, CE_{2,n}, CE_{3,n}, \ldots, CE_{k,n}) - \sum_{n=1}^{L}\text{Min}(CE_{1,n}, CE_{2,n}, CE_{3,n}, \ldots, CE_{k,n})}{\sum_{n=1}^{L} CE_{mean,n}} \quad (7)$$

or similarly and in a more compact form, $$M = \frac{CE_{max,ave} - CE_{min,ave}}{CE_{mean,ave}} \quad (8)$$

In this first exemplary embodiment of the present invention, the metric M is further used to estimate a delay spread or the RMS delay spread of the multipath channel.

According to the present invention, the estimation of the delay spread (or RMS delay spread) of the multipath channel, corresponding to the metric M can be performed/calculated using a linear interpolation function as given by the following expression:

$$\text{RMS}(M) = \text{RMS}_a + \frac{(M - M_a)(\text{RMS}_b - \text{RMS}_a)}{(M_b - M_a)} \quad (9)$$

where $\text{RMS}_a$ and $\text{RMS}_b$ are predetermined root mean square delay spread values (or delay spread values) in a lookup table and $M_a$ and $M_b$ are predetermined metric values in the lookup table. $\text{RMS}_a$, $\text{RMS}_b$, $M_a$ and $M_b$ are according to the present invention selected based on the determined metric M.

According to embodiments of the present invention, the predetermined lookup table consists of a list of metric values and matching RMS delay spread values that can be generated either through simulation using channel models or through channel measurements.

According to embodiments of the present invention, alternatively, the RMS delay spread corresponding to the determined metric M can be estimated by evaluating a predetermined polynomial function of degree R, denoted here, RMS (M), at the determined metric M, and given by:

$$\text{RMS}(M) = \sum_{i=0}^{R} c_i M^i \quad (10)$$

This polynomial approach requires finding coefficients $c_i$ of a polynomial of degree R that fits the determined metric M to the RMS delay spread in a least square sense.

Table 1 below illustrates, in the left column, the steps that are needed for establishing the delay spread values and metric values in the lookup table through simulations using a channel model. In the right column of Table 1 there are illustrated the steps required for determining the polynomial coefficients through simulation or channel measurements.

TABLE 1

| Lookup table | Polynomial coefficients |
|---|---|
| 1. Set the RMS delay spread of the channel to t ns | 1. Set the RMS delay spread of the channel to t ns |
| 2. When a packet is received, calculate and store the variables $CE_{max}$, $CE_{min}$ and $CE_{mean}$ | 2. When a packet is received, calculate and store the variables $CE_{max}$, $CE_{min}$ and $CE_{mean}$ |
| 3. Repeat Step 2 for L number of packets (e.g., L = 5000) | 3. Repeat step 2 for L number of packets (e.g., L = 5000) |
| 4. After receiving D number of packets, calculate the average of each variable stored in Step 2 and form the metric $M_t = (CE_{max,ave} - CE_{min,ave})/CE_{mean,ave}$. The entry (t, $M_t$) is then stored in the lookup table. | 4. After receiving L number of packets, calculate the average of each variable stored in Step 2 and form the metric $M_t = (CE_{max,ave} - CE_{min,ave})/CE_{mean,ave}$. |
| | 5. Repeat Steps 1-4 for several RMS delay spread values (e.g., t = [5, 10, 15, 25, 50, 75, |

TABLE 1-continued

| Lookup table | Polynomial coefficients |
| --- | --- |
| 5. Repeat Steps 1-4 for several RMS delay spread values (e.g., t = [5, 10, 15, 25, 50, 75, 100, 150, 200, 250] | 6. Polynomial curve fitting: find the coefficients of a polynomial RMS(M) of degree R that fits data metric points to the RMS delay spreads in a least square sense. |

As depicted in Table 1 and according to the first exemplary embodiment of the present invention, the metric values in the lookup table and the coefficients of the polynomial function are also calculated using the expression of the metric presented in equation (8). However, since the RMS delay spread values are preset (see step 1 in Table 1) to some typical values that are dependent on a selected channel model, both the RMS preset values and corresponding metric values (see step 4 in Table 1) are considered as predetermined values when the actual real time RMS delay spread of the multipath channel is determined according to the flowchart depicted in FIG. 3.

Figure 4A:
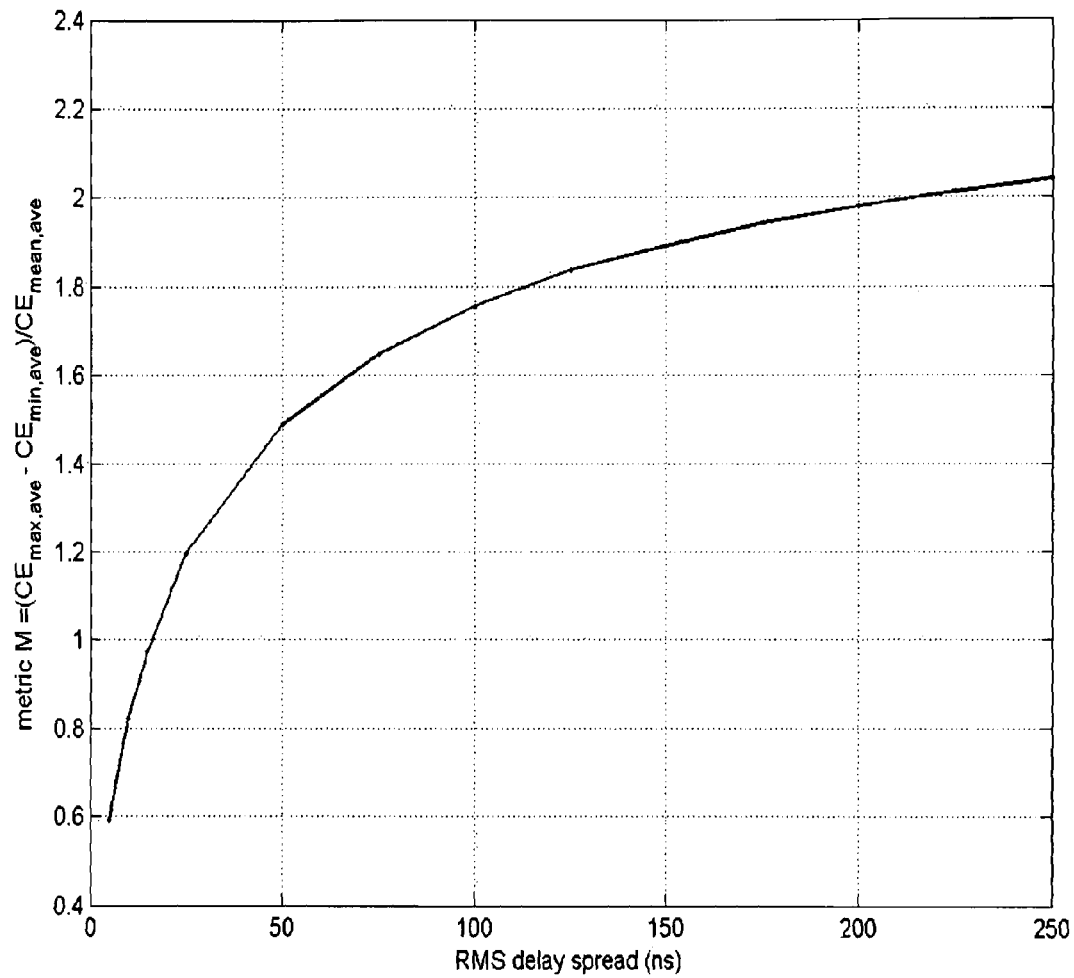
FIG. 4A illustrates a delay spread characteristic curve suitable for use in conjunction with the first exemplary embodiment of the present invention.

As an example, FIG. 4A illustrates a delay spread characteristic curve generated following the steps given in Table 1 when an IEEE 802.11a channel is used as the channel model. In FIG. 4B the lookup table corresponding to the curve shown in FIG. 4A, is populated with predetermined RMS delay spread values and predetermined metric values that can be used to determine the RMS delay spread according to embodiments of the present invention. Note that the present invention is not restricted to the IEEE 802.11a channel model. Instead, the present invention may be applicable to any other channel model that is based on an OFDM system or actual channel measurements.

Regarding the second approach that uses a polynomial function to determine the RMS delay spread in accordance with the present invention, Table 2 below illustrates an example of polynomial coefficients corresponding to the RMS delay spread characteristic curve shown in FIG. 4A.

TABLE 2

| $C_0$ | $C_1$ | $C_2$ | $C_3$ | $C_4$ |
| --- | --- | --- | --- | --- |
| 290 | −1172 | 1699 | −1035 | 234 |

According to Table 2, a fourth order polynomial function that fits the predetermined metric values to the RMS delay spread values given by the curve of FIG. 4A is expressed using the coefficients in Table 2 by to the following equation:

$$RMS(M) = \sum_{i=0}^{4} c_i M^i \quad (11)$$
$$= 290 \cdot M^0 - 1172 \cdot M^1 +$$
$$1699 \cdot M^2 - 1035 \cdot M^3 + 234 \cdot M^4$$

In the following example it is assumed that the metric M that is determined in accordance with the above described exemplary embodiment of the present invention is equal to 1, i.e. M=1.

Using the linear interpolation function given by equation (9) in conjunction with the lookup table illustrated in FIG. 4B, the predetermined RMS delay spread values and corresponding metric values are equal to: $(M_a, RMS_a) = (0.9733, 10)$; $(M_b, RMS_b) = (1.1957, 25)$, which gives us an estimation of the RMS delay spread value: RMS(M=1)≈12 ns.

If we instead use the polynomial function given by equation (10) and further assuming that the determined metric M=1 and that the polynomial function is of degree 4, the RMS delay spread value of the multipath channel is given according to the expression below:

$$RMS(M = 1) = \sum_{i=0}^{4} c_i M^i$$
$$= 290 \cdot 1^0 - 1172 \cdot 1^1 +$$
$$1699 \cdot 1^2 - 1035 \cdot 1^3 + 234 \cdot 1^4$$
$$\approx 16 \text{ ns}$$

It should be noted that the complexity involved in the lookup table approach is less compared to the polynomial interpolation approach. This is because the polynomial interpolation approach requires 4 addition/subtraction operations and 10 multiplication operations, whereas the lookup table approach requires 4 addition/subtraction operations, 1 multiplication operation and 1 division operation. In overall, the polynomial interpolation approach requires extra 9 multiplication operations compared to the lookup table approach. On the other hand, the lookup table approach requires 1 division operation. However, the time complexity for 9 multiplication operations may be considered larger than 1 division operation; hence the lookup table approach is less complex. However, the polynomial interpolation approach gives improved accuracy compared to the lookup table approach.

In the above described exemplary embodiment of the present invention, the performance of estimating the delay spread or the RMS delay spread varies with the signal to noise ratio (SNR) of the received signals. In other words, the method described in conjunction with FIG. 3 gives sufficient accuracy at high SNRs but achieves lower accuracy at low SNRs.

According to a second exemplary embodiment of the present invention, the estimation of the delay spread of the RMS delay spread of the multipath channel is, in addition to the metric M, also dependent on an estimated SNR.

Figure 5:
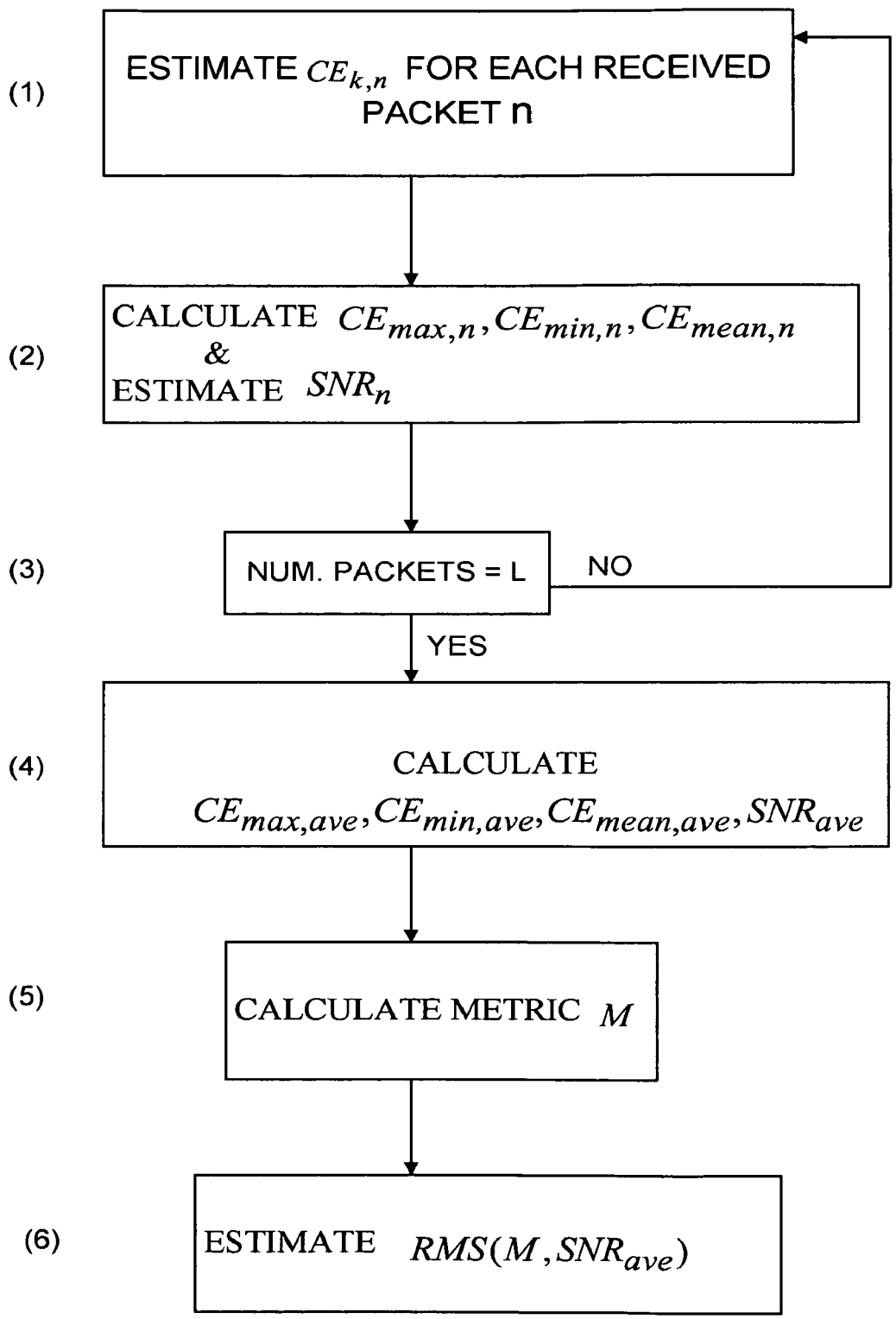
FIG. 5 is a flowchart of a method for estimating a delay spread (or RMS delay spread) of a multipath channel according to a second exemplary embodiment of the present invention.

FIG. 5 illustrates a flowchart of a method according to a second exemplary embodiment of the present invention.

Similarly to the first embodiment, a metric M is also here determined/calculated as a function of the estimated magnitude values $CE_{k,n}$ of the channel estimates and of the mean magnitude values $CE_{mean,n}$ as given previously by equation (7) or equation (8)

However, in addition to the calculated metric M that is used to estimate the delay spread or the RMS delay spread of the multipath channel, the method according to the present exemplary embodiment also takes into consideration an average SNR, denoted $SNR_{ave}$, when estimating the delay spread of the multipath channel.

In order to calculate the average SNR, $SNR_{ave}$, the SNR for each received packet n, $SNR_n$, is estimated and stored, as illustrated in step 2 in FIG. 5. Note that, e.g., the SNR for each received packet n can be calculated/estimated using predefined training symbols that are inserted into the data symbols of the packet n.

Referring back to FIG. 5, after that L packets have been received (see step 3 in FIG. 5) the average SNR is calculated according to:

$$SNR_{ave} = \frac{1}{L}\sum_{n=1}^{L} SNR_n \qquad (11)$$

In this second exemplary embodiment of the present invention, the metric M is, similarly to the previous embodiment, used to estimate a delay spread or the RMS delay spread of the multipath channel. The RMS delay spread is estimated either by using the linear interpolation function given previously in equation (9) or by using the polynomial function given previously in equation (10). However, in this second exemplary embodiment of the present invention, the steps required when establishing the metric values and the RMS delay spread values in the lookup table and also the polynomial coefficients using a channel model, differs from that of the previously described exemplary embodiment in that the SNR is also taken into consideration. The steps required for establishing the metric values and the RMS delay spread values are illustrated below in Table 3.

Figure 6A:
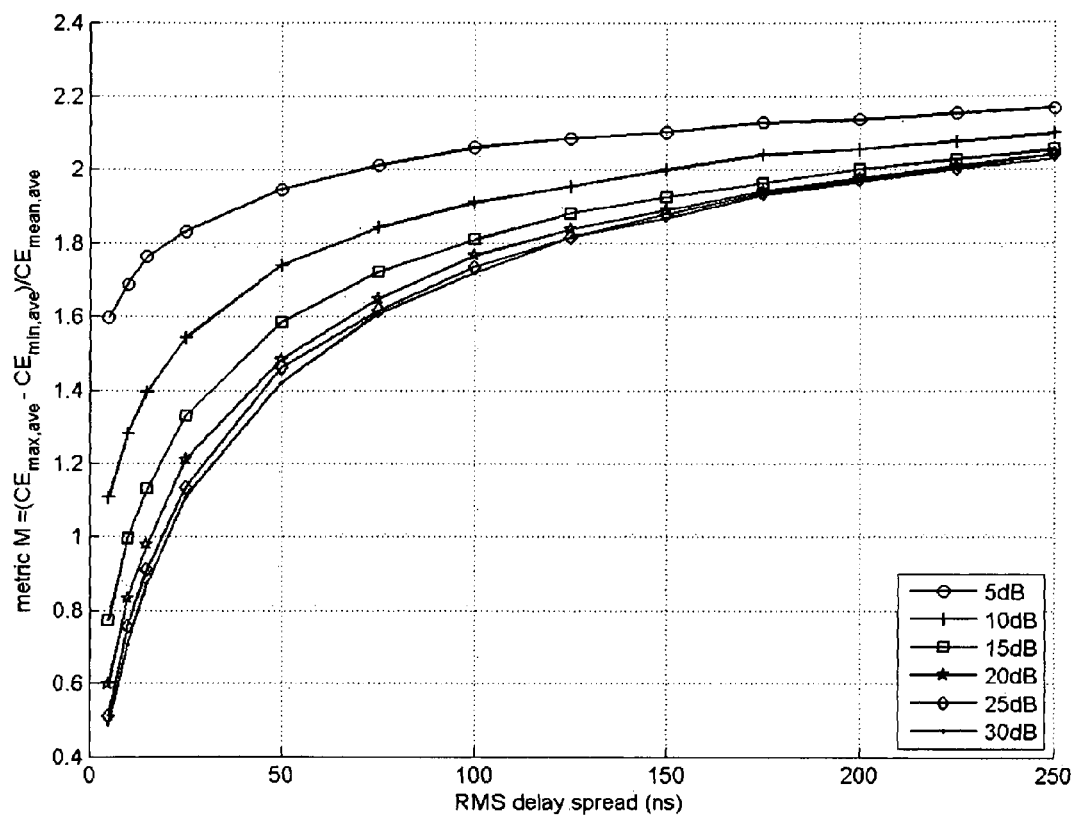
FIG. 6A illustrates delay spread characteristic curves suitable for use in conjunction with the second exemplary embodiment of the present invention.

It is observed in FIG. 6A and FIG. 6B that at moderate and high SNR values, only a single characteristic curve is sufficient to obtain an estimate of the RMS delay spread of the multipath channel.

Note that in order to determine the RMS delay spread of a multipath channel using the method according to the second exemplary embodiment of the present invention, the average SNR is used to decide which curve in FIG. 6A or column in FIG. 6B that should be selected. As an example, if the average SNR, $SNR_{ave}$ is less than 7.5 dB, the predetermined delay spread values and the metric values corresponding to the second column (5 dB column) in FIG. 6B are selected and the RMS delay spread value of the multipath channel is therefore estimated based on these predetermined values in conjunction with the metric M calculated using equation (7) or equation (8).

In case $SNR_{ave}$ is estimated to be larger than or equal to 7.5 dB but less than 12.5 dB, the entries in the column corresponding to an SNR equal to 10 dB (see FIG. 6A) can be used in conjunction with the metric M given in equation (7) or equation (8) to calculate the RMS delay spread of the multipath channel. Thus, the selected characteristic curve in FIG. 6, depends on the estimated average SNR, $SNR_{ave}$. Again, the RMS delay spread of the multipath channel may be estimated using either equation (9) or equation (10).

Figure 7:
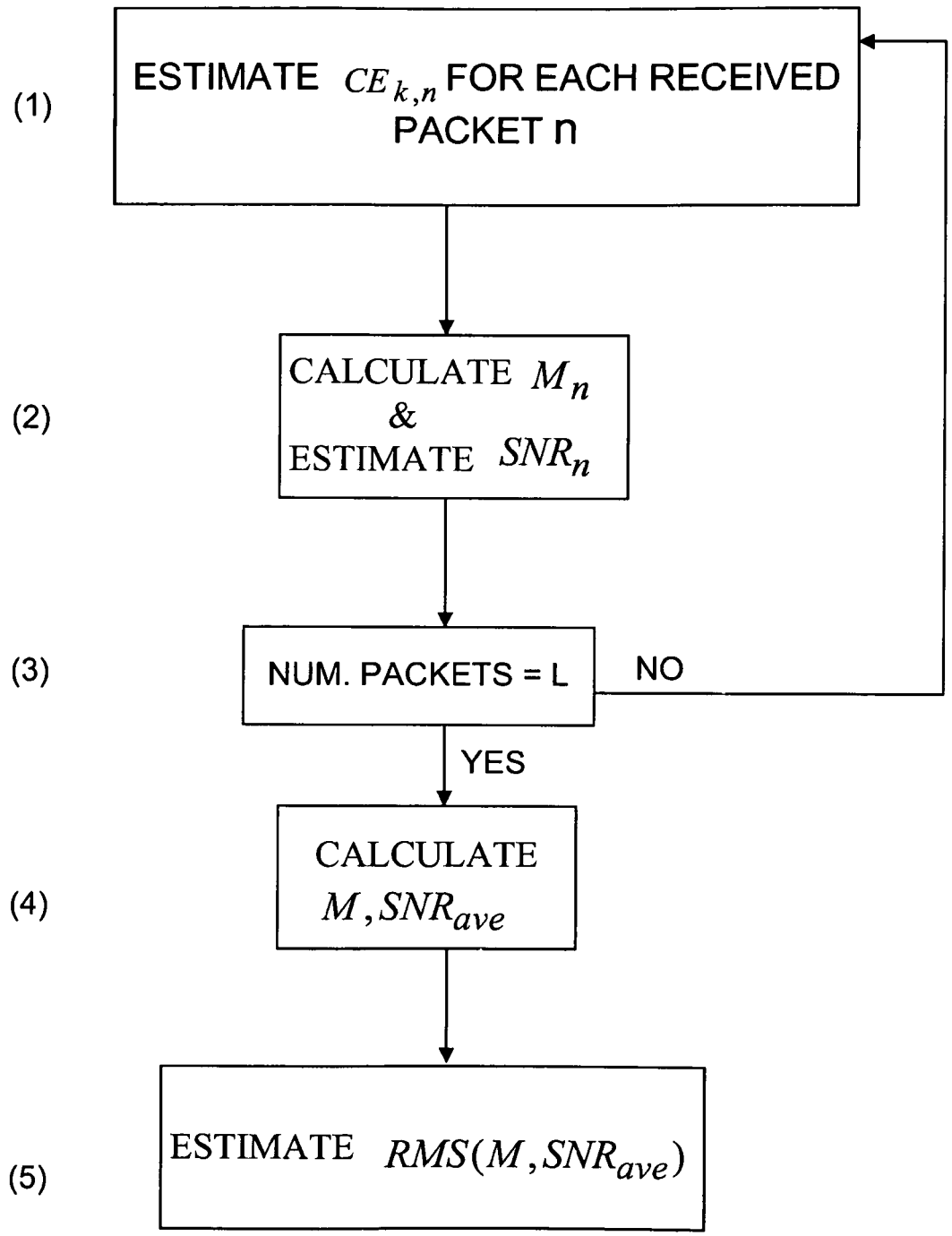
FIG. 7 is a flowchart of a method for estimating a delay spread (or RMS delay spread) of a multipath channel according to a third exemplary embodiment of the present invention.

Referring to FIG. 7 there is illustrated a flowchart of a method according to a third exemplary embodiment of the present invention. Similarly to the previously described first and second embodiments of the invention, the RMS delay spread or the delay spread of a multipath channel is also here

TABLE 3

| Lookup table | Polynomial coefficients |
|---|---|
| 1. Set the target SNR to xdB<br>2. Set the RMS delay spread of the channel to t ns<br>3. When a packet is received, calculate and store the variables $CE_{max}$, $CE_{min}$ and $CE_{mean}$<br>4. Repeat Step 3 for L number of packets (e.g., L = 5000)<br>5. After receiving L number of packets, calculate the average of each variable stored in Step 3 and form the metric $M_t = (CE_{max,ave} - CE_{min,ave})/CE_{mean,ave}$. The entry (x, t, $M_t$) is then stored in the lookup table.<br>6. repeat steps 2-5 for several RMS delay spread values (e.g., t = [5, 10, 15, 25, 50, 75, 100, 150, 200, 250]<br>7. repeat steps 1-6 for several SNRs (e.g., SNR = [5, 10, 15, 20, 25, 30]) | 1. Set the target SNR to xdB<br>2. Set the RMS delay spread of the channel to t ns<br>3. When a packet is received, calculate and store the variables $CE_{max}$, $CE_{min}$ and $CE_{mean}$<br>4. Repeat Step 3 for L number of packets (e.g., L = 5000)<br>5. After receiving L number of packets, calculate the average of each variable stored in Step 3 and form the metric $M_t = (CE_{max,ave} - CE_{min,ave})/CE_{mean,ave}$.<br>6. Repeat Steps 2-5 for several RMS delay spread values (e.g., t = [5, 10, 15, 25, 50, 75, 100, 150, 200, 250]<br>7. Polynomial curve fitting: find the coefficients of a polynomial RMS(M) of degree R that fits data metric points to the RMS delay spreads in a least square sense.<br>repeat Steps 1-7 for several SNRs |

FIG. 6A illustrates exemplary delay spread characteristic curves generated following the steps given in Table 3 and using an IEEE 802.11a channel as the channel model. In FIG. 6B the lookup table corresponding to the curves shown in FIG. 6A, is populated with predetermined RMS delay spread values and predetermined metric values that can be used to estimate the RMS delay spread according to this second exemplary embodiment of the present invention. Note that the RMS delay spread values and the metric values are determined for each SNR value. Again, the present invention is not restricted to the IEEE 802.11a channel model. Instead, the present invention may be applicable to any other channel model that is based on actual channel measurements.

estimated based on a metric M being a function of estimated magnitude values $CE_{k,n}$ of the channel estimates and the mean magnitude values $CE_{mean,n}$. However, in this third exemplary embodiment of the present invention, a metric $M_n$ is determined for each received packet n (see Step 1 in FIG. 7) in addition to the SNR for each packet n, SNR. According to this exemplary embodiment of the present invention, the metric $M_n$ is given by equation (12) below:

$$M_N = \sum_{j=1}^{\lceil N/(d+1)\rceil} |CE_{(d+1)j,n} - CE_{(d+1)j-d,n}| \qquad (12)$$

where N is the number of subcarriers excluding null subcarriers, d is an integer number representing the distance between said subcarriers; (d+1)j corresponds to a subcarrier k (i.e. k=(d+1)j); ⌊•⌋ is the mathematical floor operator and |•| is the absolute value operator. The distance d which is a design parameter may for example be equal to 1, 2, 4, 6, etc. . . . .

Referring back to FIG. 7, in step 2, a check is performed on whether L (e.g. L=3, 5, 10, 20, . . . ) packets have been received or not. If L packets have been received, the metric M is determined by taking the average of metric $M_n$ divided by the average of the mean magnitude values $CE_{mean,n}$ as given by equation (13) below:

$$M = \frac{\frac{1}{L}\sum_{n=1}^{L} M_n}{\frac{1}{L}\sum_{n=1}^{L} CE_{mean,n}} = \frac{\sum_{n=1}^{L} M_n}{\sum_{n=1}^{L} CE_{mean,n}} \quad (13)$$

As in the previously described second embodiment of the present invention, the delay spread or the RMS delay spread of the multipath channel can be estimated based on the metric M and on the average SNR, $SNR_{ave}$. A lookup table approach (see equation (9)) or a polynomial interpolation function (see equation (10)) may further be used to estimate a value of the delay spread of the multipath channel.

Again, the predetermined RMS delay values and the predetermined metric values in the lookup table may be generated either through simulations using channel models or channel measurements. Note that the steps presented in Table 3 may also be used to determine the entries in the lookup table and the polynomial coefficients. However, instead of determining $CE_{max}$ and $CE_{min}$, metric values in Table 3 (see Steps 3-5) may be calculated using equation (12) and equation (13) given above, i.e. by using equation (12) in step 3 and equation (13) in step 5 of Table 3.

Figure 8:
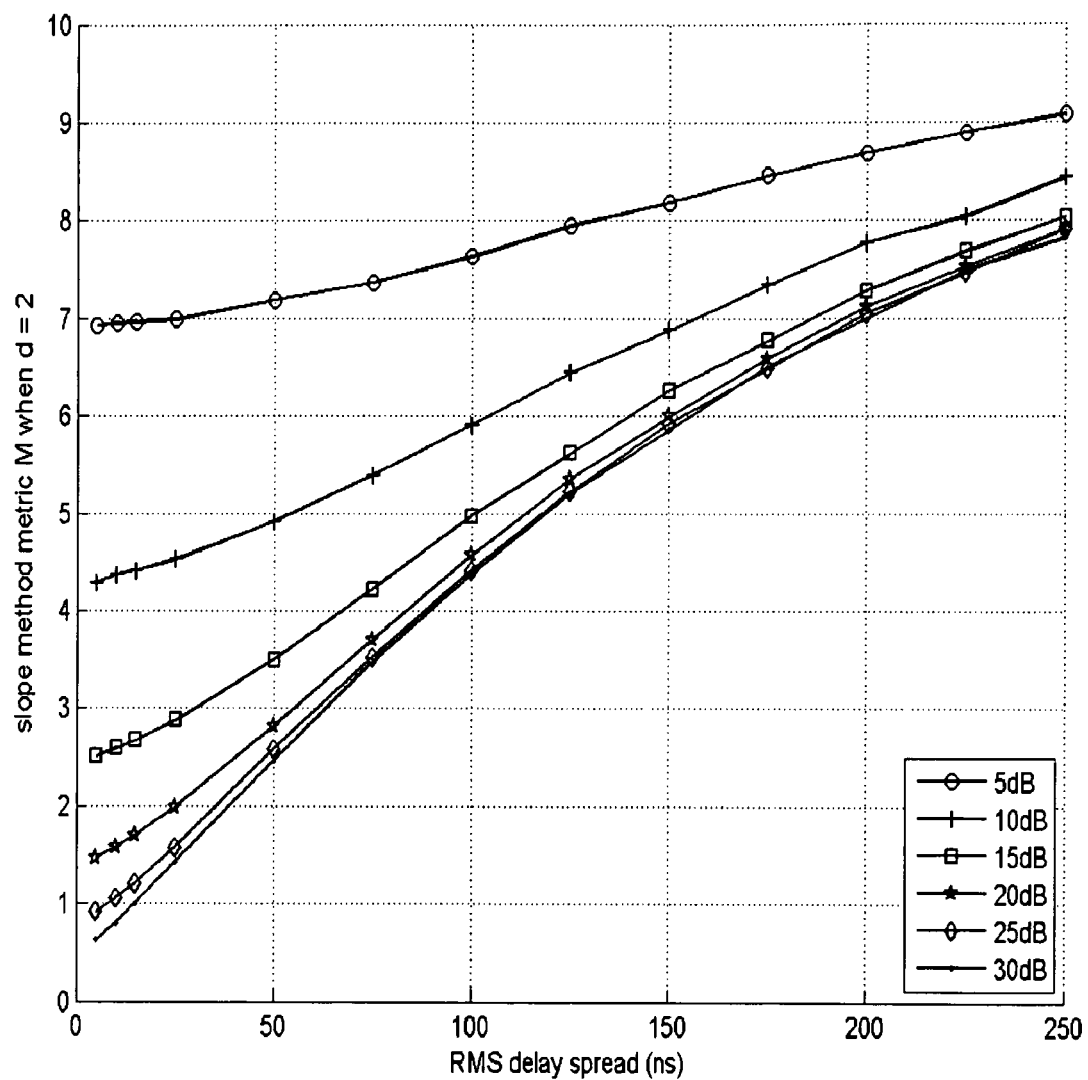
FIG. 8 illustrates delay spread characteristic curves suitable for use in conjunction with the third exemplary embodiment of the present invention.

Referring to FIG. 8 there is illustrated delay spread characteristic curves generated using the IEEE 802.11a channel as the channel model. For generating these curves, equation (12) and equation (13) has been used in Table 3 in order to determine the metric values for different SNR values, where d=2. As illustrated in FIG. 8, this exemplary embodiment of the present invention is referred to as the slope method since the slope between magnitude values of subcarriers channel estimates were taken into account when calculating the metric given by equation (12).

Similarly to the previous embodiment, at moderate and high SNR values only one characteristic curve is sufficient to obtain an estimate of the delay spread or the RMS delay spread of a multipath channel.

Before describing an apparatus for estimating a delay spread or an RMS delay spread of a multipath channel in accordance with another embodiment of the present invention, estimation performance of the previously described exemplary embodiments of the present invention are compared using an IEEE 802.11n OFDM wireless system for an estimated RMS delay spread equal to 50 ns at SNRs equal to 15 dB respectively 25 dB. In this simulation, the underlying channel was modelled using the IEEE 802.11a channel model, the RMS delay spread value of 50 ns was estimated by averaging L=10 independent packets and simulation length was set to 10000 packets per SNR value (15 dB resp. 25 dB).

Table 4 below illustrates how may percentage of estimates are within 20%, 30% and 40% error when the RMS delay spread of the multipath channel is estimated using the above described embodiments of the present invention, denoted here Emb-1, Emb-2 respectively Emb-3.

TABLE 4

| Error | Delay Spread Range (ns) | 15 dB | | | 25 dB | | |
|---|---|---|---|---|---|---|---|
| | | Emb-1 | Emb-2 | Emb-3 | Emb-1 | Emb-2 | Emb-3 |
| 20% | 40-60 | 46% | 55% | 75% | 60% | 64% | 93% |
| 30% | 35-65 | 59% | 74% | 92% | 81% | 83% | 99% |
| 40% | 30-70 | 69% | 88% | 98% | 91% | 92% | 100% |

It should be noted that the present invention is not restricted to the design parameters given above.

From Table 4 it can be clearly observed that the estimation performance using Emb-3 gives the highest performance compared to that given by Emb-1 and Emb-2. As an example and referring to Table 4 above, 75% of estimates are (for Emb-3) within 20% error (i.e. between 40 ns and 60 ns) for an SNR equal to 15 dB compared to the percentages of estimates for Emb-1 and Emb-2 which are 46% respectively 55% for the same SNR value of 15 dB. For an SNR equal 25 dB, the estimation performance using Emb-3 still performs better than that of Emb-1 and Emb-2. That is, the highest the percentage of estimates the greater the performance.

Concerning the computational complexity comparison between the exemplary embodiments Emb-1, Emb-2 and Emb-3, the required number of operations for all three embodiments has been observed to be less than that of the prior art techniques when determining the delay spread or the RMS delay spread of a multipath channels.

Concerning the computational complexity comparison between the exemplary embodiments Emb-2 and Emb-3 of the present invention, Table 5 below illustrates the number of operations required for estimation of a delay spread or a RMS delay spread of a multipath channel. The exemplary system parameters considered for the determination of the delay spread (or RMS delay spread) include: 56 subcarriers excluding null subcarriers; a delay spread estimated by averaging of L=10 independent packets; polynomial interpolation using, for Emb-2, polynomial curve fitting to find coefficients of a polynomial function of degree 4; polynomial interpolation using, for Emb-3, polynomial curve fitting to find coefficients of a polynomial function of degree 4, and d=2 (for Emb-3).

TABLE 5

| Operation Type | Number of Operations Emb-2 | Number of Operations Emb-3 |
|---|---|---|
| Additions and Subtractions | 582 | 913 |
| Multiplications (including inverse multiplications) | 15 | 15 |
| Divisions | 1 | 1 |
| Comparisons (max/min) | 1020 | 0 |

From Table 5, it can be observed that using Emb-2 to obtain an estimate of a delay spread, it requires additional 1020 comparisons compared to that when using Emb-3. Note that Emb-3 requires extra 313 addition/subtraction operations compared to Emb-2. However since the logic involve with a comparator is similar to that of an adder, it is reasonable to assume that computational complexity of a comparison operation is equivalent to that of an addition/subtraction operation. Therefore, with this assumption Emb-2 requires extra 689 (=1020−331) addition/subtraction operation than Emb-3. As a result, Emb-3 is computationally less intensive compared to Emb-2.

In general, a division operation has the highest computational complexity (i.e. time complexity of performance computations) compared to the other mathematical operations such as division, subtraction, multiplication, etc. However, division operations can be fully avoided by converting them to LOG 2 domain, i.e. a division operation is equivalent to a subtraction operation in LOG (Logarithmic) domain. Applying the LOG 2 domain is for example preferable to use when calculating e.g. the metric M using equation (7), (8) or (13). However, when dividing with a constant (e.g. by N or L) using for example equation (3) and (11) it is preferable to multiply with the inverse of these constants i.e. dividing by N is similar to multiplying by $N^{-1}$.

Figure 9:
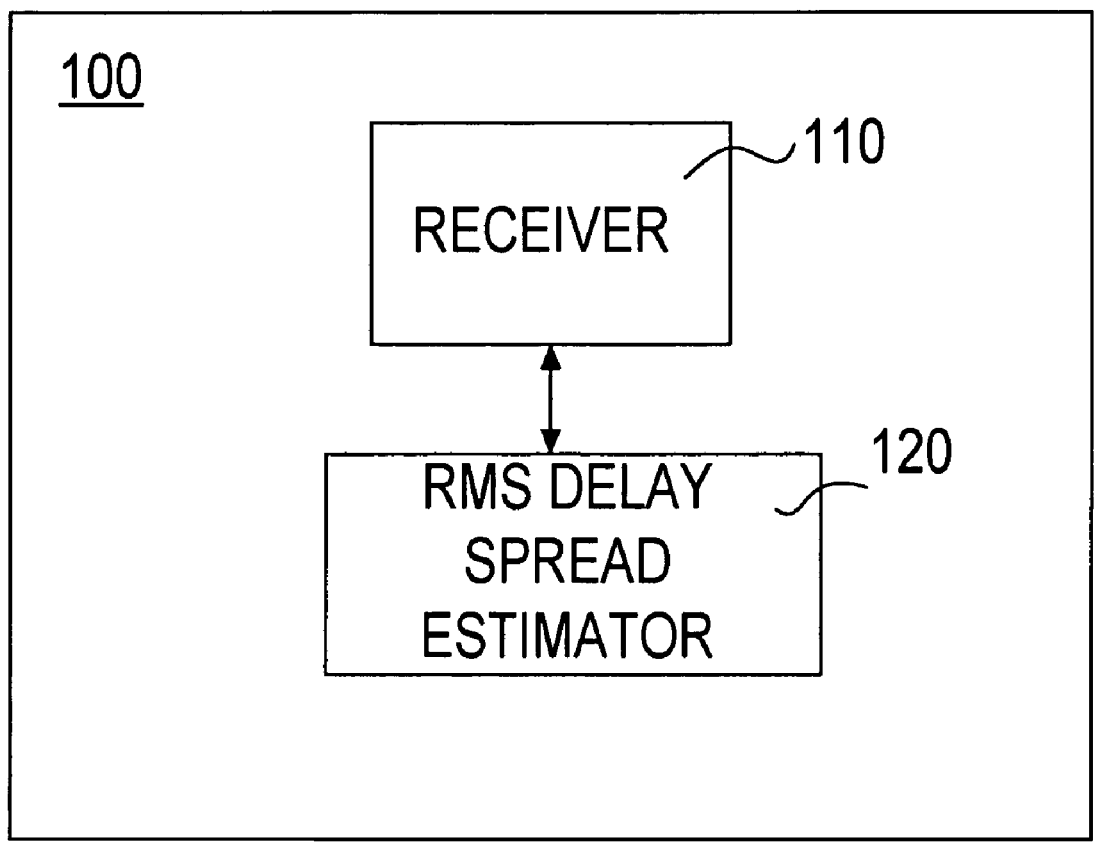
FIG. 9 is a schematic block diagram of an exemplary embodiment of an apparatus in accordance with the present invention.

Referring to FIG. 9 there is depicted an exemplary embodiment of an apparatus 100 for estimating a delay spread or a RMS delay spread of a multipath channel according to the present invention. It should be noted that apparatus 100 may be implemented in any wireless/wired communication device that is capable in receiving/transmitting multicarrier signals (e.g. OFDM signals). In addition, apparatus 100 may be implemented on any communication system. As an example, a communication system capable in handling multicarrier signal (e.g. WiFi and/or WiMAX) may be equipped with a single antenna (single input single output), also known as SISO systems or may be equipped with multiple antennas (multiple input and multiple output antennas), also known as MIMO systems.

As illustrated in FIG. 9, apparatus 100 comprises a signal receiver 110 that is capable in receiving multicarrier signals composed of successive packets each comprising a plurality of subcarriers carrying data. The receiver 110 is further capable in estimating the channel in a frequency domain. The estimation of the channel may be performed using e.g. predefined preamble signal or pilot subcarriers that are inserted into data symbols or be based on any other prior art channel estimation method, such as blind or adaptive channel estimation methods. According to the present invention, the receiver 110 is configured to estimate, for each received packet n, a magnitude value $CE_{k,n}$ of a channel estimate of each subcarrier excluding null subcarriers. According to the present invention, apparatus 100 further comprises a delay spread estimator (or a RMS delay spread estimator) 120 that is connected to receiver 110. The delay spread estimator 120 is configured to determine or calculate, for each received packet, a mean magnitude value $CE_{mean,n}$ of the estimated magnitude values $CE_{k,n}$ of the channel estimates.

According to the present invention, the delay spread estimator 120 is further adapted in determining a metric M which is a function of the estimated magnitude values $CE_{k,n}$ of the channel estimates and of the mean magnitude values $CE_{mean,n}$ determined for each received packet. Based on the metric M, the delay spread estimator 120 further estimates the delay spread (or the RMS delay spread) of a multipath channel through which the received signals/packets have traversed.

According to an embodiment of the present invention, the receiver 110 is further configured to determine, for each received packet n, a signal to noise ratio, $SNR_n$, which is used as an additional input to the delay spread estimator 120. The delay spread estimator 120 is further adapted to calculate and store a maximum magnitude value, $CE_{max,n}$, for each received packet n and a minimum magnitude value, $CE_{min,n}$, for each received packet n. After that a predetermined number of packets L have been received by receiver 110, the delay spread estimator 120 is further configured to calculate an average SNR over L packets $SNR_{ave}$, an average mean magnitude values $CE_{mean,ave}$ over L packets, an average maximum value $CE_{max,ave}$ over L packets and an average minimum value $CE_{min,ave}$ over L packets.

According to an embodiment of the present invention, the delay spread estimator 120 calculates the metric M as a function of $CE_{max,n}$, $CE_{min,n}$, and $CE_{mean,ave}$ as given by equation (7) or (8).

Alternatively, the delay spread estimator 120 is configured to calculate and store a metric value $M_n$ for each packet n received by receiver 110. The metric value $M_n$ for each received packet n was previously expressed in equation (12). The delay spread estimator 120 is further configured to determine an average of $M_n$ over L packets. In this case, the delay spread estimator is configured to calculate a metric M as a function of $M_n$ and $CE_{mean,ave}$ as given by equation (13).

According to the present invention, the delay spread estimator 120 is further configured to determine and store a lookup table composed of delay spread values and metric values that are used to determine the delay spread of the multipath channel. Alternatively, the delay spread estimator 120 may be configured to determine and store coefficients of a polynomial function. The steps required for determining the delay spread values and the metric values of the lookup table and/or the coefficients of the polynomial function was previously presented in Table 1 and Table 3. In determining the delay spread or RMS delay spread of a multipath channel based on the determined metric M given by equation (7) or equation (13), the delay spread estimator 120 may be configured to perform a linear interpolation (see equation (9) or a polynomial interpolation (see equation (10)).

According to the present invention, apparatus 100 is further adapted to change and/or adapt the mode of the equipment or system it is implemented in, based on the delay spread or RMS delay spread estimated by delay spread estimator 120. The mode adaptation of an equipment/system may comprise the following list which is not exhaustive:

Guard interval selection (short vs large) for OFDM systems such as WLAN and WiMax: The guard interval is a means to reduce detrimental effects due to delay spread in the multipath channel. By inserting a time delay (guard interval) between consecutive OFDM symbols and cyclically repeating the useful data of the symbol during the guard interval, desired symbol can be decoded effectively when the maximum delay spread of the channel is less than the length of the guard interval. If the delay spread of the channel is small, then a shorter guard interval can be inserted instead of a long guard interval, resulting higher useful throughput.

Rate adaptation: Improving the link's data rate as a function of determined delay spread. As the channel delay spread increases the packet error rate of the system increases. With this in mind, the rate adaptation algorithm can lower the data-rate to guarantee reliable communications in long delay spread channels. Alternatively if the channel is estimated as having a low delay spread then the data-rate may be increased.

Optimising the channel smoothing filter coefficients as a function of delay spread: Channel smoothing filter can be enabled/disabled depending on the delay spread estimate. In large delay spread channels, the channel smoothing filter can be disabled to prohibit the mixing of channel estimates which have been distorted by ISI.

Optimising the synchronisation algorithm to improve the accuracy of the time estimating: For example, when the channel delay spread is found to be greater than a sampling interval, the cross-correlation metric (which is usually used as a timing synchronisation criterion function) should be averaged over the estimated channel delay spread to avoid having multiple peaks and therefore synchronisation ambiguity. Also, the delay for auto/cross-correlation can be increased/decreased in proportion to the delay spread estimate.

Optimise equaliser coefficients including adaptive equaliser structures: The time domain equaliser can use the determined delay spread estimate to alter the number and value of the tap gain coefficients of the equaliser.

As mentioned earlier, apparatus 100 may be implemented in a communication system (e.g. WiFi/WLAN and/or WiMAX) capable in handling multicarrier signals. It was also mentioned above that a communication system in which apparatus 100 can be implemented, may be equipped with a single antenna (SISO system) or may be equipped with multiple antennas (MIMO system).

As an example, in case apparatus 100 is implemented in a MIMO system, the receiver 110 is equipped with $n_R$ receive antennas and the transmitter of the MIMO system is equipped with $n_T$ transmit antennas. Therefore there are $n_R \times n_T$ transmit-receive path pairs, resulting in $n_R \times n_T$ channel estimates sets per received packet. Therefore, in a MIMO system, a lesser number of packets are needed when determining a delay spread according to the present invention, than when a SISO system is used. Note that in case apparatus 100 is implemented in a SISO system, $n_R$ and $n_T$ would be equal to 1 and only one set composed of channel estimates is used for each received packet to estimate the delay spread of a channel. It should also be noted that lookup tables and/or polynomial coefficients that are used to estimate the delay spread of a channel and that are generated for SISO systems can be directly used in MIMO systems without any modifications.

Table 6 below illustrates an example of estimation performance of apparatus 100 implemented in a an OFDM system that uses a MIMO antenna system, and wherein the previously described exemplary embodiments (Emb-1, Emb-2, Emb-3) of the present invention are compared using an IEEE 802.11n OFDM wireless system with $n_T=2$ transmit antennas and $n_R=2$ receive antennas at SNRs 15 dB and 25 dB. In the simulation, the underlying channel was modelled using the IEEE 802.11n Channel-E (RMS delay spread of 100 ns); the delay spread was estimated by averaging L=12 channel estimate sets (i.e. 3 packets) and the simulation length was set to 5000 packets per SNR value.

TABLE 6

| Error | Delay Spread Range (ns) | 15 dB | | | 25 dB | | |
|---|---|---|---|---|---|---|---|
| | | Emb-1 | Emb-2 | Emb-3 d = 2 | Emb-1 | Emb-2 | Emb-3 d = 2 |
| 10% | 90-100 | 25% | 25% | 68% | 24% | 28% | 75% |
| 20% | 80-120 | 47% | 49% | 94% | 49% | 52% | 97% |
| 30% | 70-130 | 61% | 63% | 99% | 71% | 73% | 100% |
| 40% | 60-140 | 72% | 79% | 100% | 87% | 87% | 100% |

From Table 6 it can be observed that the estimation performance using Emb-3 (with d=2) still gives higher performance compared to that given by Emb-1 and Emb-2. As an example and referring to Table 6 above, 68% of estimates are (for Emb-3) within 10% error (i.e. between 90 ns and 100 ns) for an SNR equal to 15 dB compared to the percentages of estimates for Emb-1 and Emb-2 which are both 25% for the same SNR value of 15 dB.

For an SNR equal to 25 dB, the estimation performance using Emb-3 still performs better than that of Emb-1 and Emb-2. Furthermore, it can be observed that the performance of Emb-1 and Emb-2 are quite similar in MIMO systems wherein apparatus 100 may be implemented. It should be emphasised that in MIMO systems, the above described embodiments (Emb-1, Emb-2, Emb-3) of the present invention, require a lesser number of packets in the averaging process than in SISO systems.

A person skilled in the art appreciates that the present invention can be realised in many ways. The apparatus can be realised in hardware with means of digital circuits or as software in a signal processing circuit. Furthermore, the receiver 110 and the channel delay estimator 120 of apparatus 100 need not be separated but may be included in a single block and may also be connected to other means.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention

The invention claimed is:

1. A method for estimating a delay spread of a multipath channel formed by successive packets of a multicarrier signal, each including a plurality of subcarriers carrying data, the method comprising:
   estimating, for each received packet (n), a magnitude value ($CE_{k,n}$) of a channel estimate of each subcarrier (k) excluding null subcarriers;
   calculating, for each received packet (n), a mean magnitude value ($CE_{mean,n}$) of said estimated magnitude values ($CE_{k,n}$) channel estimates;
   estimating, after a number of packets (L) have been received, a delay spread or a root mean square, RMS, delay spread of said multipath channel based on at least a metric (M), said metric (M) is calculated as a function of said estimated magnitude values ($CE_{k,n}$) of said channel estimates and said mean magnitude values ($CE_{mean,n}$).

2. The method according to claim 1 wherein said mean magnitude value ($CE_{mean,n}$) of said channel estimates is, for each received packet (n), calculated according to:

$$CE_{mean,n} = \frac{1}{L}\sum_{k=1}^{L} CE_{k,n},$$

wherein N is the number of subcarriers excluding null subcarriers.

3. The method according to claim 2, further comprising estimating a signal to noise ratio ($SNR_n$) for each received packet (n); calculating a average signal to noise ratio ($SNR_{ave}$) after that said number (L) of packets have been received and estimating the delay spread or the RMS delay spread of the multipath channel based on said calculated metric (M) and said average signal to noise ratio ($SNR_{ave}$).

4. The method according to claim 1, further comprising estimating a signal to noise ratio ($SNR_n$) for each received packet (n); calculating a average signal to noise ratio ($SNR_{ave}$) after that said number (L) of packets have been received and estimating the delay spread or the RMS delay spread of the multipath channel based on said calculated metric (M) and said average signal to noise ratio ($SNR_{ave}$).

5. The method according to claim 1, wherein the estimating said magnitude value ($CE_{k,n}$) of a channel estimate of each subcarrier (k) further comprises, for each received packet (n), determining the maximum magnitude value ($CE_{max,n}$) and the minimum magnitude value ($CE_{min,n}$) of said estimated magnitude values ($CE_{k,n}$) of the channel estimates.

6. The method according to claim 5, further comprising determining the average maximum magnitude value ($CE_{max,ave}$); the average minimum magnitude value ($CE_{min,ave}$) and the average mean and magnitude value ($CE_{mean,ave}$) after that said number of packets (L) have been received according to:

$$CE_{max,ave} = \frac{1}{L}\sum_{n=1}^{L} CE_{max,n}$$

$$CE_{min,ave} = \frac{1}{L}\sum_{n=1}^{L} CE_{min,n}$$

$$CE_{mean,ave} = \frac{1}{L}\sum_{n=1}^{L} CE_{mean,n}.$$

7. The method according to claim 6 wherein said metric (M) is calculated as a function of said average maximum magnitude value ($CE_{max,ave}$) said average minimum magnitude value ($CE_{min,ave}$) and said average mean magnitude value ($CE_{mean,ave}$) and given by:

$$M = \frac{CE_{max,ave} - CE_{min,ave}}{CE_{mean,ave}} = \frac{\sum_{n=1}^{L} CE_{max,n} - \sum_{n=1}^{L} CE_{min,n}}{\sum_{n=1}^{L} CE_{mean,n}}.$$

8. The method according to claim 1, wherein the step of estimating said magnitude value of a channel estimate ($CE_{k,n}$) of each subcarrier (k) further comprises calculating for each received packet (n), a metric ($M_n$) according to:

$$M_n = \sum_{j=1}^{\lceil N/(d+1)\rceil} |CE_{(d+1)j,n} - CE_{(d+1)j-d,n}|$$

wherein N is the number of subcarriers excluding null subcarriers, d is an integer number representing the distance between said subcarriers; (d+1)j corresponds to a subcarrier k; $\lceil \cdot \rceil$ is the mathematical floor operator and $|\cdot|$ is the absolute value operator.

9. The method according to claim 8, further comprising calculating, after said number of packets (L) have been received, the metric (M) as a function of said metric ($M_n$) determined for each received packet (n) and said mean magnitude values ($CE_{mean,n}$), according to:

$$M = \frac{\sum_{n=1}^{L} M_n}{\sum_{n=1}^{L} CE_{mean,n}}.$$

10. The method according to claim 1, wherein the estimation of the delay spread or the RMS delay spread of the multipath channel is calculated using a linear interpolation according to:

$$RMS(M) = RMS_a + \frac{(M - M_a)(RMS_b - RMS_a)}{(M_b - M_a)}$$

wherein ($RMS_a$, $RMS_b$) are delay spread values in a lookup-table and ($M_a$, $M_b$) are metric values in said lookup-table and wherein said delay spread values and metric values are selected based on at least said calculated metric (M).

11. The method according to claim 10, wherein the delay spread values ($RMS_a$, $RMS_b$) and the metric values ($M_a$, $M_b$) in said look-up table are further selected based on said calculated metric (M) and on said average signal to noise ratio ($SNR_{ave}$).

12. The method according to claim 1, wherein the estimation of the delay spread or the RMS delay spread of the multipath channel is calculated using a polynomial interpolation function given by:

$$RMS(M) = \sum_{i=0}^{R} c_i M^i$$

wherein M is said calculated metric, $c_i$ are polynomial coefficients that are determined based on at least metric values and on delay spread values and (R) is the degree of said interpolation function RMS(M).

13. The method according to claim 12 wherein said delay spread or said RMS delay spread is further dependent on said average signal to noise ratio ($SNR_{ave}$).

14. The method according to claim 1, wherein said multicarrier signal is an orthogonal frequency division multiplexing, OFDM, multicarrier signal and wherein said channel estimates ($CE_{k,n}$) are estimated in the frequency domain.

15. An apparatus (100) for estimating a delay spread of a multipath channel formed by successive packets of a multicarrier signal, each including a plurality of subcarriers carrying data, said apparatus comprising:
a receiver (110), configured to estimate, for each received packet (n), a magnitude value ($CE_{k,n}$) of a channel estimate of each subcarrier (k) excluding null subcarriers;
a delay spread estimator (120), configured to calculate, for each received packet (n), a mean magnitude value ($CE_{mean,n}$) of said estimated magnitude values ($CE_{k,n}$) of said channel estimates, said delay spread estimator (120) being further adapted to estimate, after a number of packets (L) have been received, a delay spread or a root mean square, RMS, delay spread of said multipath channel based on at least a metric (M), said metric (M) is calculated as a function of said estimated magnitude values ($CE_{k,n}$) of said channel estimates and said mean magnitude values ($CE_{mean,n}$).

16. The apparatus (100) according to claim 15 wherein said delay spread estimator (120) is configured to calculate, for each received packet (n), said mean magnitude value ($CE_{mean,n}$) of said channel estimates, according to $$CE_{mean,n} = \frac{1}{N}\sum_{k=1}^{N} CE_{k,n}$$

wherein N is the number of subcarriers excluding null subcarriers.

17. The apparatus (100) according to claim 16, wherein said receiver (110) is further adapted to estimate a signal to noise ratio ($SNR_n$) for each received packet (n); and wherein said delay spread estimator (120) is further configured to calculate a average signal to noise ratio ($SNR_{ave}$) after that said number (L) of packets have been received and further configured to estimate the delay spread or the RMS delay spread of the multipath channel based on said calculated metric (M) and said average signal to noise ratio ($SNR_{ave}$).

18. The apparatus (100) according to claim 15, wherein said receiver (110) is further adapted to estimate a signal to noise ratio ($SNR_n$) for each received packet (n); and wherein said delay spread estimator (120) is further configured to calculate a average signal to noise ratio ($SNR_{ave}$) after that said number (L) of packets have been received and further configured to estimate the delay spread or the RMS delay spread of the multipath channel based on said calculated metric (M) and said average signal to noise ratio ($SNR_{ave}$).

19. The apparatus (100) according to claim 15, wherein said delay spread estimator (120) is further arranged to determine the maximum magnitude value ($CE_{max,n}$) and the minimum magnitude value ($CE_{min,n}$) of said estimated magnitude values ($CE_{k,n}$) of the channel estimates.

20. The apparatus (100) according to claim 19 wherein said delay spread estimator (120) is further arranged to determine the average maximum magnitude value ($CE_{max,ave}$); the average minimum magnitude value ($CE_{min,ave}$) and the average mean magnitude value ($CE_{mean,ave}$) after that said number of packets (L) have been received according to:

that said number of packets (L) have been received according to:

$$CE_{max,ave} = \frac{1}{L}\sum_{n=1}^{L} CE_{max,n}$$

$$CE_{min,ave} = \frac{1}{L}\sum_{n=1}^{L} CE_{min,n}$$

$$CE_{mean,ave} = \frac{1}{L}\sum_{n=1}^{L} CE_{mean,n}.$$

21. The apparatus (100) according to claim 20 wherein said delay spread estimator (120) is configured to calculate said metric (M) as a function of said average maximum magnitude value ($CE_{max,ave}$); said average minimum magnitude value ($CE_{min,ave}$) and said average mean magnitude value ($CE_{mean,ave}$), said metric (M) is given by:

$$M = \frac{CE_{max,ave} - CE_{min,ave}}{CE_{mean,ave}} = \frac{\sum_{n=1}^{L} CE_{max,n} - \sum_{n=1}^{L} CE_{min,n}}{\sum_{n=1}^{L} CE_{mean,n}}.$$

22. The apparatus (100) according to claim 15, wherein said delay spread estimator (120) is further adapted to calculate and store, for each received packet (n), a metric ($M_n$) according to:

$$M_n = \sum_{j=1}^{\lceil N/(d+1)\rceil} |CE_{(d+1)j,n} - CE_{(d+1)j-d,n}|$$

wherein N is the number of subcarriers excluding null subcarriers, d is an integer number representing the distance between said subcarriers; (d+1)j corresponds to a subcarrier k; $\lceil \cdot \rceil$ is the mathematical floor operator and $|\cdot|$ is the absolute value operator.

23. The apparatus (100) according to claim 22, wherein said delay spread estimator (120) is further configured to calculate, after that said number of packets (L) have been received, the metric (M) as a function of said metric ($M_n$) determined for each received packet (n) and said mean magnitude values ($CE_{mean,n}$), according to:

$$M = \frac{\sum_{n=1}^{L} M_n}{\sum_{n=1}^{L} CE_{mean,n}}.$$

24. The apparatus (100) according to claim 15, wherein the apparatus is further configured to determine and store a lookup table composed of delay spread values and metric values that are further used by said delay spread estimator (120) to estimate a delay spread of said multipath channel as a function of said calculated metric (M) according:

$$RMS(M) = RMS_a + \frac{(M - M_a)(RMS_b - RMS_a)}{(M_b - M_a)}$$

wherein ($RMS_a, RMS_b$) are selected delay spread values in said lookup-table based on at least said metric (M) and ($M_a, M_b$) are selected metric values in said lookup-table based on said at least said metric (M).

25. The apparatus (100) according to claim 24 wherein said selected delay spread values ($RMS_a, RMS_b$) and said selected metric values ($M_a, M_b$) are further selected based said average signal to noise ratio ($SNR_{ave}$).

26. The apparatus (100) according claim 15, wherein said delay spread estimator (120) is further configured to estimate the delay spread or the RMS delay spread of the multipath channel by using a polynomial interpolation function given by:

$$\text{RMS}(M) = \sum_{i=0}^{R} c_i M^i$$

wherein M is said calculated metric, $c_i$ are polynomial coefficients that are determined based on at least metric values and on delay spread values and (R) is the degree of said interpolation function RMS(M).

27. The apparatus (100) according to claim 26 wherein said delay spread or said RMS delay spread is further dependent on said average signal to noise ratio ($SNR_{ave}$).

28. A communication OFDM system including an apparatus (100) according to claim 15, and at least one of a multi input multi output (MIMO) antenna system and a single input single (SISO) output antenna system.

29. The communication OFDM system according to claim 28, wherein the communication OFDM system is at least one of a WiFi system and a WiMAX system.

* * * * *